US005312030A

United States Patent [19]

Baravalle

[11] Patent Number: 5,312,030
[45] Date of Patent: May 17, 1994

[54] MAGNETICALLY ATTACHED ROOF RACK FOR A MOTOR VEHICLE
[75] Inventor: Ugo Baravalle, Turin, Italy
[73] Assignee: FAPA S.p.A., Beinasco, Italy
[21] Appl. No.: 52,674
[22] Filed: Apr. 27, 1993
[51] Int. Cl.⁵ .................................................. B60R 9/00
[52] U.S. Cl. ................................... 224/324; 224/309; 224/917
[58] Field of Search ............... 224/324, 309, 917, 317; 248/638, 635, 618

[56] References Cited
FOREIGN PATENT DOCUMENTS
2423565 11/1975 Fed. Rep. of Germany ...... 224/324
211951 7/1987 Italy .
2185948 8/1987 United Kingdom ................ 224/324

Primary Examiner—Linda J. Sholl
Attorney, Agent, or Firm—Sughrue, Mion, Zinn, Macpeak & Seas

[57] ABSTRACT

A magnetically-attachable roof rack, in particular a ski rack, comprises on the one hand a flexible plate which is made of magnetic material and can be fitted on a vehicle roof, and a flexible base plate attached to the magnetic plate, and on the other hand a rack unit supported by the base plate, with vibration-damping means interposed. The vibration-damping means constitute a semi-articulated flexible coupling connected to the base plate in an area around its center. The flexible coupling preferably comprises a resiliently flexible intermediate plate and vibration-damping supports which connect the intermediate plate securely to the base plate on the one hand and to the rack unit on the other hand.

10 Claims, 4 Drawing Sheets

MAGNETICALLY ATTACHED ROOF RACK FOR A MOTOR VEHICLE

BACKGROUND OF THE INVENTION

The present invention relates to a magnetically attachable roof rack for a motor vehicle, of the type which comprises a flexible plate which is made of magnetic material and can be fitted on the roof and which can be adapted to the shape of the latter, a flexible base plate connected to the plate made of magnetic material and attached to the latter, and a rack unit supported by the base plate with vibration-damping means interposed, in order to prevent vibrations from being transmitted from the rack unit to the metal plate.

The invention was conceived for application to a ski rack, but this application is not limiting.

Many examples of magnetically attached devices of the type in question are already known, including those known from documents DE-A-2 423 565, DE-A-3 135 649, DE-A-3 221 126, FR-A-2 582 062 and IT-A-90 22271.

The prior art closest to the invention is disclosed in document IT-U-211 951. This document concerns a ski rack in which a rack unit, shaped so as to receive two pairs of skis, is pivotable about a vertical rod which is integral with the centre of a metal base plate, which in turn is integral with the magnetic plate. The rack unit is slidable along the vertical rod and is retained on the latter with the interposition of elastic means in the form of a helical compression spring which enables the rack unit to oscillate vertically and to damp the vertical stresses transmitted to the base plate by the rod.

According to this known solution all the lateral forces applied to the rack unit, such as for example those caused by centrifugal force on bends and by the relative wind, are transmitted in the form of twisting moments, of which the point of application is concentrated at the base of the rod, on the metal base plate and on the underlying magnetic plate.

It will be appreciated that since the rack unit is attached to the metal plate only at a central point of the latter, it is subject to considerable lateral oscillations, which in the long term can give rise to spontaneous detachment of the magnetic plate from the roof. Additionally, when the magnetic plate is being detached from the roof, the metal base plate tends to be deformed by being drawn outwards in the centre, causing it to become detached unintentionally from the magnetic plate.

These disadvantages could be eliminated by the thickness of the base plate being increased, but an increase in the thickness of the base plate stiffens it and impedes adaptation of the flexible magnetic plate to the "convexity" or curvature of the vehicle roof.

In order to prevent these problems, an alternative solution could consist of widening the attachment base, in other words the base plate and the underlying magnetic plate, but even if this is done it detracts from the ability of the magnetic plate to be adapted to the roof and, additionally, from the point of view of vibrations, the opposite result of a very rigid product which does not absorb the vibrations is obtained.

The above-described disadvantages are also encountered in other types of magnetically attached devices, such as for example that according to DE-A-2 423 565.

Another solution aimed at avoiding the aforementioned disadvantage consists in connecting the magnetic supports in pairs by means of crosspieces and/or longitudinal members, as shown for example in documents DE-A-3 221 126 and FR-A-2 582 062.

However this solution has the disadvantage that it makes the operations of fitting and removing the ski rack or general purpose rack unnecessarily complex, and additionally does not permit use for example of two supports alone, aligned in the vicinity of an edge of the roof.

SUMMARY OF THE INVENTION

The object of the invention is to produce a magnetic attachment device of the type in question, which does not have the above-described disadvantages.

This object is achieved according to the invention by means of a device of the type initially described, characterised in that the vibration-damping means consists of a semi-articulated flexible coupling which is connected to the base plate at points distributed around its centre, and which enables the rack unit to oscillate angularly in planes which are vertical relative to the base plate.

By virtue of this solution, neither the torsional stresses caused by the lateral forces which are exerted on the rack unit, nor the vertical tensile stresses, are now concentrated on the base plate.

The flexible coupling preferably comprises an intermediate, resiliently flexible plate, interposed between the base plate and the rack unit and spaced from both, and vibration-damping supports which securely connect the base plate and the intermediate plate on the one hand, and the intermediate plate and the rack unit on the other, these anti-vibration supports all being disposed in positions other than the in central area of the plates.

According to this preferred embodiment, the intermediate plate receives all the vibrations and deformations caused by the movements of the rack unit, without transmitting them substantially to the magnetic plate and thus to the vehicle roof.

BRIEF DESCRIPTION OF THE DRAWINGS

The subject of the invention will be better understood by means of the following detailed description provided purely by way of non-limiting example with reference to the appended drawings, in which.

DETAILED DESCRIPTION OF THE INVENTION

Figure 1:
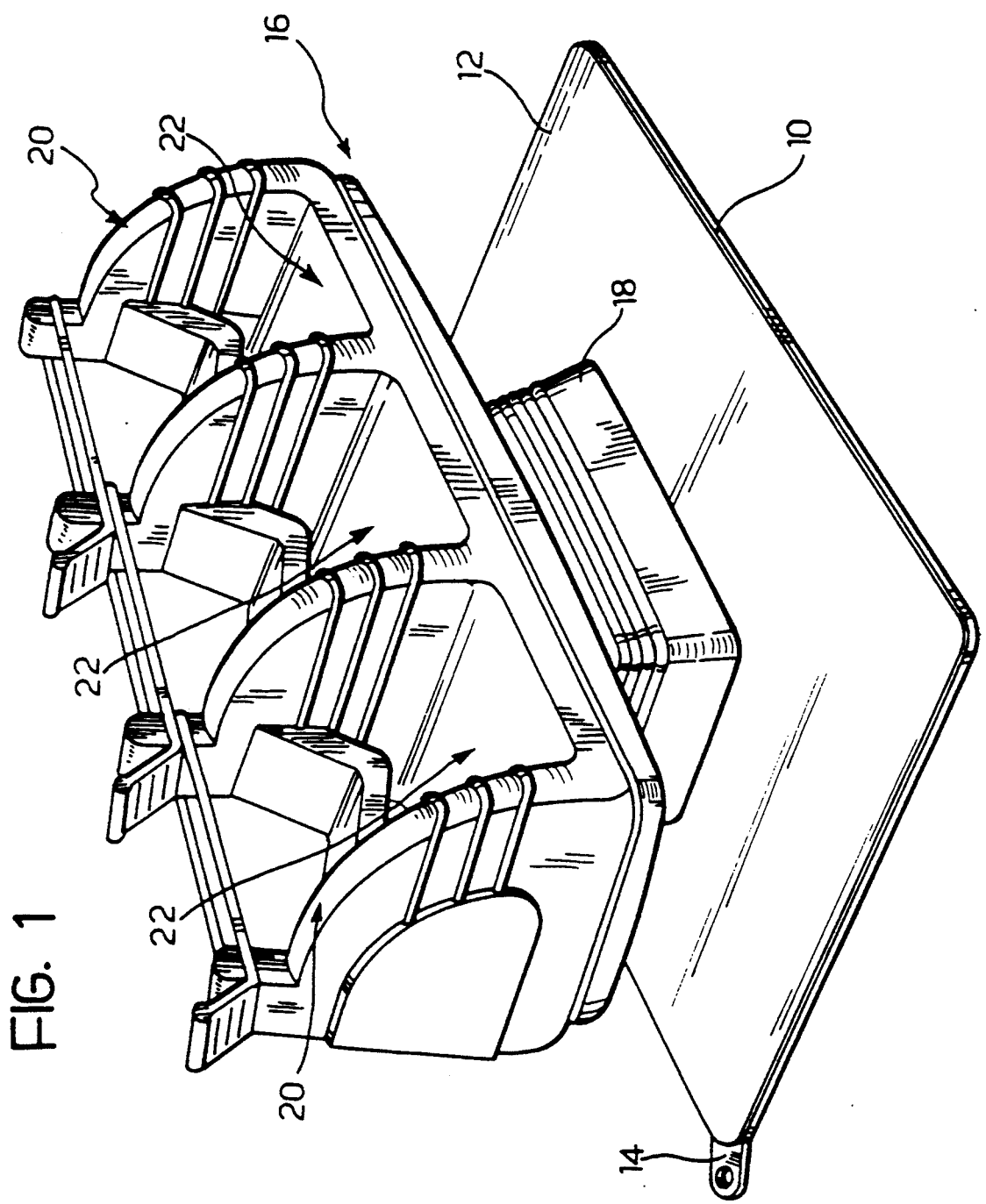
FIG. 1 is a perspective view of a magnetically attached ski rack which incorporates the characteristics of the invention.

With reference to all the Figures, a ski rack according to the invention comprises a flexible plate 10 which is made of magnetic material of a known type and which can be fitted to a vehicle roof and can adapt to the shape of the latter. The magnetic plate 10 is covered by a flexible metal base plate 12 glued to the magnetic plate 10. The base plate 12 is provided in a known manner with a grip tab 14 which facilitates detachment of the ski rack from the vehicle roof.

On the base plate 12 there is secured a ski rack unit indicated 16 as a whole. As shown, the unit 16 preferably comprises two separate shaped parts made of plastics material, consisting of a lower support 18 and an upper head 20. The head 20 is shaped so as to have seats 22 in order to receive respective pairs of skis.

For other uses, a head such as 16 could be shaped so as to receive various objects, such as for example fishing rods, windsurfing equipment etc.

Advantageously a device according to the invention could be designed with various types of rack heads which could be selected according to requirements, and with a single type of support 18.

Figure 2:
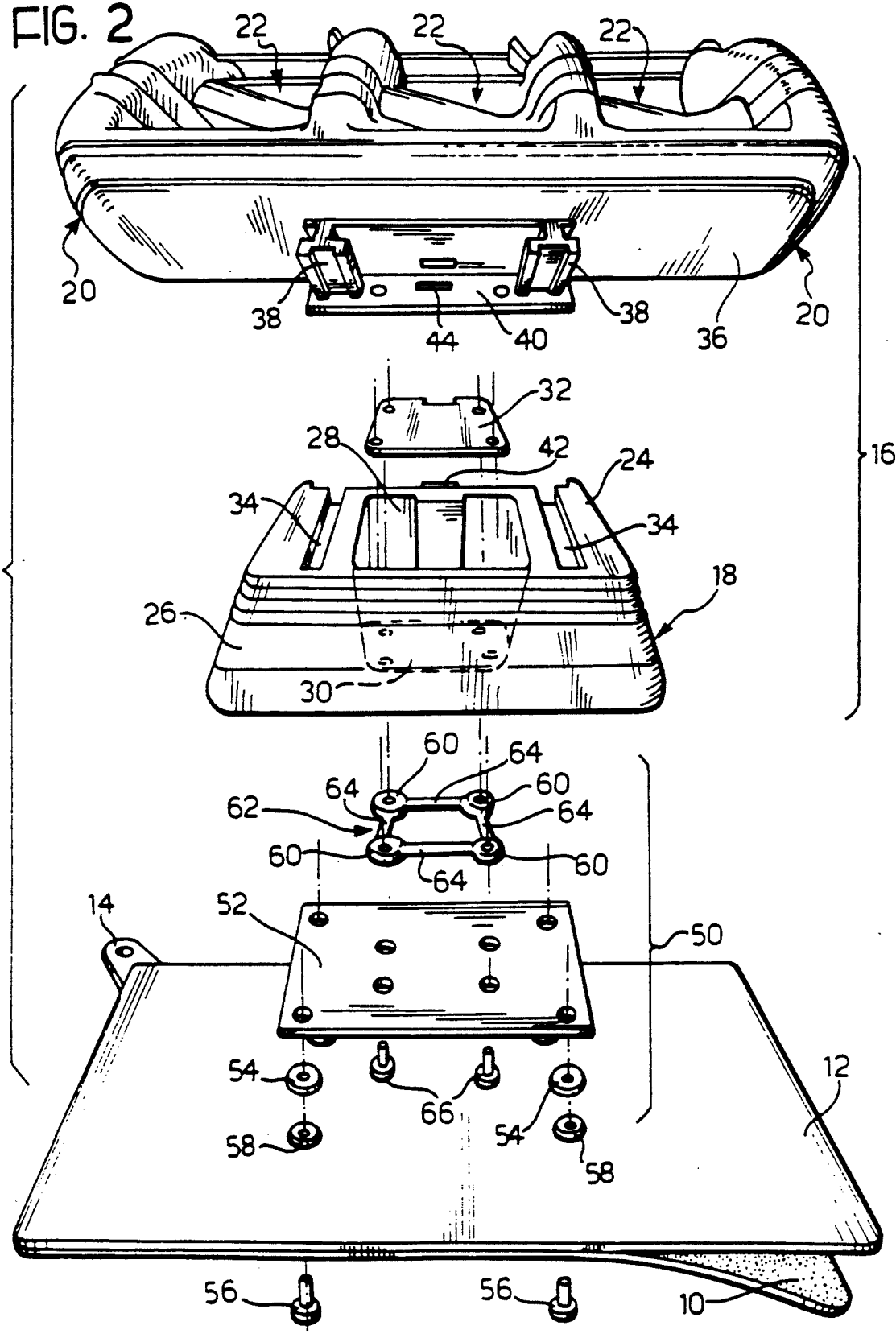
FIG. 2 is an exploded perspective view.
Figure 3:
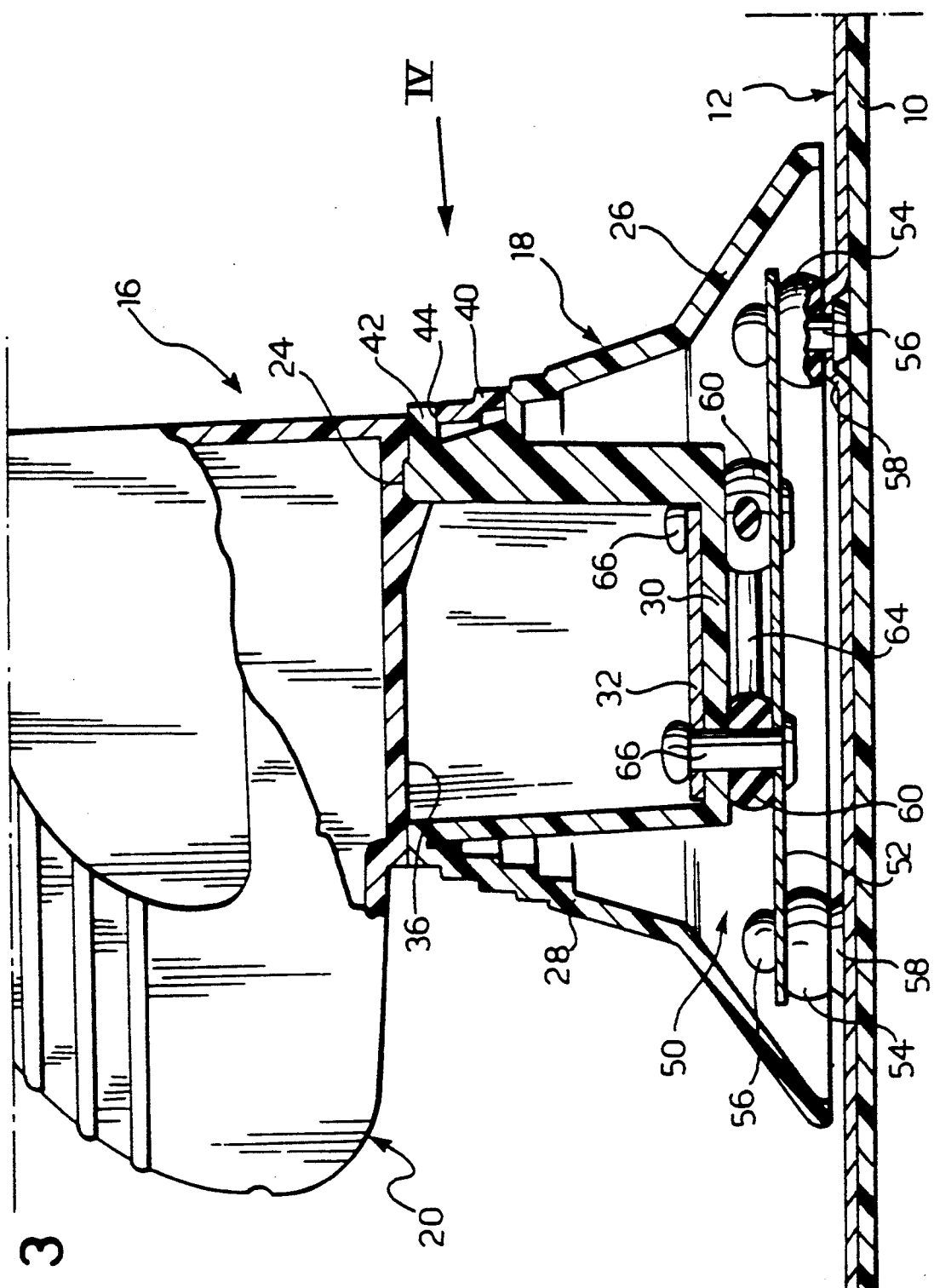
FIG. 3 is a side elevational view partially sectioned in a vertical plane.
Figure 4:
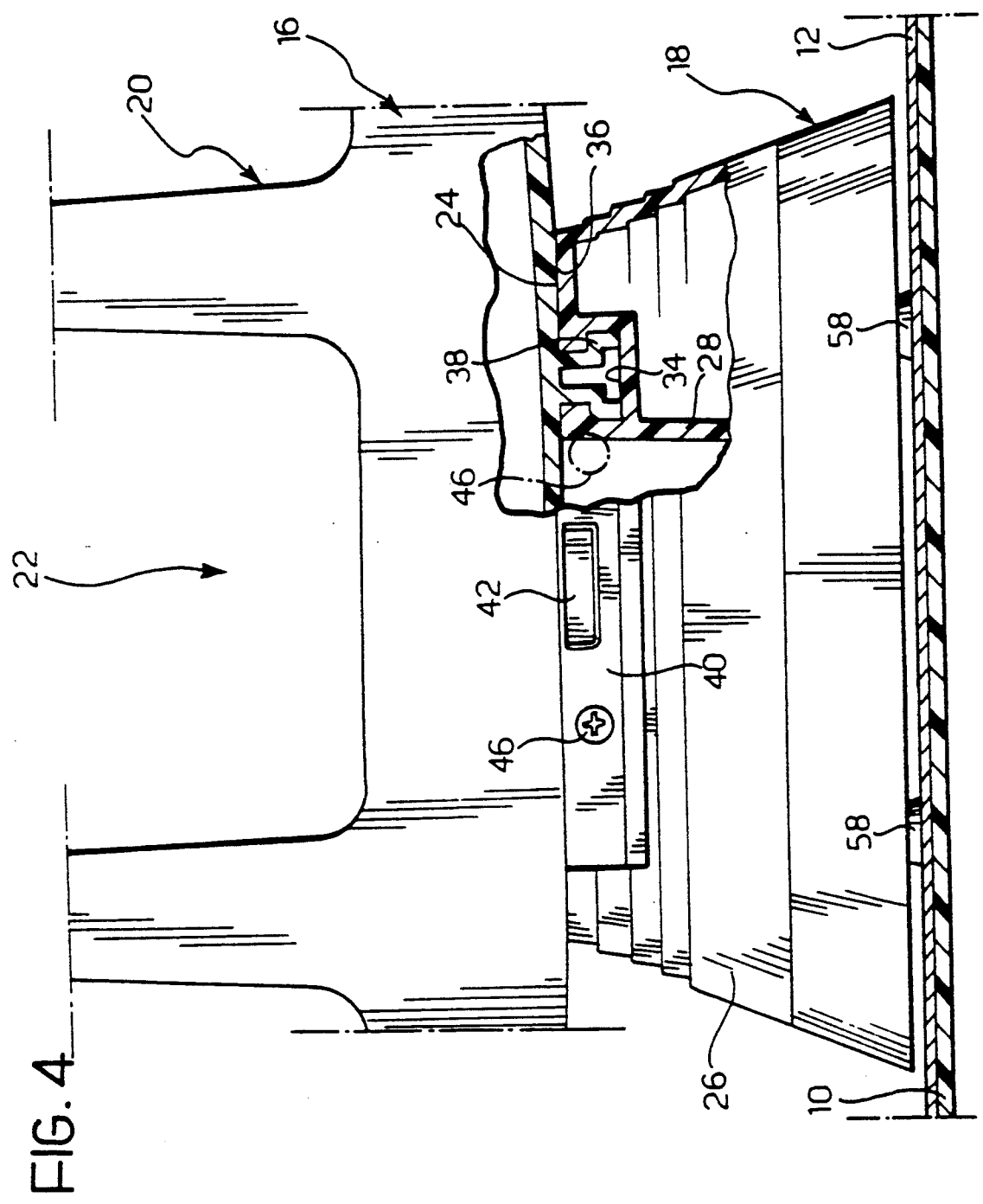
FIG. 4 is a front elevation partially sectioned in a vertical plane perpendicular to the section plane of FIG. 3.

With reference to FIGS. 2 to 4, the support 18 is shaped such that it has an upper wall 24, a peripheral skirt 26 and a bowl-shaped central part 28. The skirt 26 extends downwards from the upper wall 24 to a position adjacent the base plate 12, in order to cover the elements described hereinafter which connect the support 18 to the plate 12. The cup-shaped central part 28 also extends downwards and ends in a base wall 30, of which the function will be specified hereinafter.

As will also be specified hereinafter, with the base wall 30 there is associated a reinforcement plate 32 which is mounted on the wall inside the bowl-shaped part 28.

On the upper wall 24 of the support 18 there are two parallel grooves 34 which have T-shaped profiles.

The upper head 20 has a lower wall 36 which, when it is coupled with the support 18, fits onto the upper wall 24 of the support. The lower wall 36 has a pair of ribs 38 with T-shaped profiles, which form tenons for coupling with the mortises formed by the grooves 34.

The support 18 and the head 20 are coupled by the relative sliding of the interlocking formations constituted by the mortises 34 and the tenons 38. It will be appreciated that the arrangement of the tenons and of the mortises could be inverted with respect to that shown, and that these mutually interlocking formations could have shapes other than those illustrated.

In order to secure the attachment of the two parts 18 and 20, the upper head 20 has a flange 40 which is disposed at the ends of its interlocking formations 38, and which, when the two parts 18 and 20 are coupled, is applied against a side of the support 18, in the manner shown in FIG. 4. As shown, the support 18 preferably has a resilient snap engagement projection 42 which, when the upper head 20 is correctly positioned relative to the support 18, snaps into an aperture 44 in the flange 40. As shown, for reasons of safety the flange 40 is preferably attached to the corresponding side of the support 18 by means of screws 46, which lock the support 18 and the head 20 together definitively.

A preferred embodiment of a flexible coupling will now be described with reference to FIGS. 2 and 3, in which, according to the invention, the rack unit or ski rack 16 is supported by the base plate 12.

This flexible coupling, which is indicated 50 as a whole, is of the semi-articulated type. For a definition of this term see "giunto elastico" (flexible coupling) in the UTET Dizionario d'Ingegneria, Torino, Italy, 1974, Vol. VI, page 36.

As shown, the flexible coupling 50 preferably has an resiliently flexible intermediate plate 52 consisting for example of a square piece of thin steel plate. As shown in FIGS. 2 and 3, the intermediate plate 52 is interposed between the base plate 12 and the base wall 30 of the support 18, in a position spaced from both the plate 12 and the wall 30.

O-rings 54 made of rubber or an equivalent material are interposed as vibration-damping supports between the base plate 12 and the intermediate plate 52. Respective rivets 56 or the like extend through the rings 54 and connect the base plate 12 firmly to the intermediate plate 52. The lower heads of the rivets 56 are accommodated in corresponding bosses 58 formed in the plate 12 by drawing, so that these heads do not interfere with the magnetic plate 10.

As shown, the vibration-damping supports constituted by the rubber rings 54 are preferably disposed at the four corners of the square formed by the intermediate plate 52, in positions quite far from the centres of the two plates 12 and 52.

Likewise between the intermediate plate 52 and the base wall 30 of the support 18 there are similar vibration-damping supports 60 made of rubber or an equivalent material. These supports may consist of O-rings which are identical to the rings 54, but a vibration-damping element of a commercially available type can advantageously be used, such as that indicated 62 in FIG. 2. This element 62 comprises four annular vibration-damping supports 60 disposed at the corners of a square and connected by rubber bridges 64.

In any case corresponding rivets 66 or the like extend through the annular supports 60, thus joining the intermediate plate 52 firmly to the base wall 30, with the help of the reinforcement plate 32. The latter is preferable, if not essential, if the base wall 30 is made of plastics material.

As can be seen, the annular vibration-damping supports 60 are disposed at the four corners of a smaller square concentric with the larger square, at the corners of which the vibration-damping supports 54 are disposed. The sides of the two squares are parallel with one another.

By virtue of this non-limiting arrangement, the rack unit is supported by the base plate 12 at points distributed around the centre of the flexible coupling 50, so that the rack unit 16 can oscillate angularly relative to the flexible plate in all the vertical planes which pass through the common vertical axis of the assembly.

I claim:

1. A magnetically-attachable roof rack for a motor vehicle, the roof rack comprising in combination a flexible plate formed from a magnetic material, said plate being capable of being fitted to the roof of said vehicle and adapting to the shape thereof, a flexible base plate connected to said flexible plate, a rack unit supported by said base plate, and vibration-damping means between said rack unit and said flexible base plate, wherein said vibration-damping means comprises a semi-articulated flexible coupling connected to said flexible base plate and said rack unit at a plurality of points spaced from the center of said flexible base plate, the rack unit being thereby enabled to oscillate angularly in planes which are vertical relative to said flexible base plate.

2. A roof rack according to claim 1, wherein said flexible coupling comprises an intermediate, resiliently flexible plate interposed between said base plate and said rack unit and spaced from both, and further comprises vibration-damping supports which securely connect together said base plate and said intermediate plate on the one hand, and said intermediate plate and said rack unit on the other, said vibration-damping supports all being disposed at said points spaced from the center of said base plate and said intermediate plate.

3. A roof rack according to claim 2, wherein the vibration-damping supports comprise rings made of a resilient material such as rubber, the rings being interposed between said base plate and said intermediate plate on the one hand and between said intermediate plate and said unit on the other hand, fastening means such as rivets extending through said rings, said fastening means connecting together said base plate and said intermediate plate on the one hand and said intermediate plate and said rack unit on the other hand.

4. A roof rack according to claim 2, wherein said vibration-damping supports which connect said base plate and said intermediate plate are disposed at the four corners of a first square, and said vibration-damping supports which connect said intermediate plate and said rack unit are disposed at the four corners of a second square, the two squares being concentric and having sides parallel with one another and said second square being smaller than said first square.

5. A roof rack according to claim 2, wherein said rack unit comprises lower and upper shaped parts made from plastics material and attached to each other, the said lower part being a support and the said upper part being a carrying head shaped according to the article to be carried, and wherein said support has a lower wall which is parallel to said intermediate plate and is attached thereto by means of said respective vibration-damping supports.

6. A roof rack according to claim 5, wherein said support is shaped so that it has an upper wall, a peripheral skirt which extends downwards from the upper wall, and a cup-shaped central part which likewise extends downwards, said skirt extending to a position adjacent said base plate and surrounding said intermediate plate and the vibration-damping supports therefor for connection to said base plate, and the cup-shaped central part having a base wall which constitutes the said lower wall of said support.

7. A roof rack according to claim 6, wherein a reinforcement plate is disposed inside said cup-shaped central part of said support, said fastening means extending through said reinforcement plate.

8. A roof rack according to claim 5, wherein said support and said carrying head are attached to each other by means of respective mutually interlocking formations respectively on the upper wall of the support and on a matching lower wall of the carrying head.

9. A roof rack according to claim 8, wherein the mutually interlocking formations are in the form of mortises and tenons which have T-shaped profiles and are coupled to one another by relative reciprocal sliding movement parallel to said lower wall and upper wall.

10. A roof rack according to claim 9, wherein one of the lower and upper parts of the rack unit has a flange disposed at the end of its interlocking formations, the flange, when the lower and upper parts are coupled, being applied against a side of the other part and attached thereto by means of fastening means such as screws, whereby the two parts are locked together against relative sliding movement.

* * * * *